(12) United States Patent
Edwards et al.

(10) Patent No.: US 6,510,611 B2
(45) Date of Patent: Jan. 28, 2003

(54) CABLE JACKET STRIPPING TOOL

(75) Inventors: Larry M. Edwards, Fremont, CA (US); Albert J. Highe, Redwood City, CA (US)

(73) Assignee: Tyco Electronics Corporation, Menlo Park, CA (US)

( * ) Notice: Subject to any disclaimer, the term of this patent is extended or adjusted under 35 U.S.C. 154(b) by 0 days.

(21) Appl. No.: 09/920,681

(22) Filed: Aug. 2, 2001

(65) Prior Publication Data

US 2002/0026711 A1 Mar. 7, 2002

Related U.S. Application Data

(63) Continuation of application No. 09/421,442, filed on Oct. 19, 1999.

(51) Int. Cl.[7] .................................................. B26B 3/00
(52) U.S. Cl. ........................................ 30/90.6; 30/90.1
(58) Field of Search ........................... 30/294, 90.1, 2, 30/90.6, 151, 152

(56) References Cited

U.S. PATENT DOCUMENTS

| | | | |
|---|---|---|---|
| 3,100,935 A | * | 8/1963 | Leafe .......................... 30/294 |
| 3,162,945 A | * | 12/1964 | Stabs ......................... 30/90.1 |
| 3,781,988 A | | 1/1974 | Jones |
| 3,881,249 A | | 5/1975 | Cox, Jr. |
| 3,946,487 A | | 3/1976 | Bieganski |
| 4,081,871 A | | 4/1978 | Knuth |
| 4,189,799 A | | 2/1980 | Litehizer, Jr. |
| 4,426,778 A | | 1/1984 | Christie |
| 4,433,484 A | | 2/1984 | Antisdel et al. |
| 4,447,949 A | | 5/1984 | Kane |
| 4,472,877 A | | 9/1984 | Undin et al. |
| 4,543,717 A | | 10/1985 | Luka |
| 5,142,780 A | | 9/1992 | Brewer |
| 5,337,479 A | | 8/1994 | Ducret |
| 5,533,264 A | | 7/1996 | Wheary |
| 5,896,667 A | | 4/1999 | Hawkins |

* cited by examiner

Primary Examiner—Douglas D. Watts
(74) Attorney, Agent, or Firm—Marguerite E. Gerstner; Elizabeth A. O'Brien; Lawrence A. Chaletsky

(57) ABSTRACT

A plastic sheath cutting and slitting hand tool for cutting and slitting a cable sheath of a cable includes a generally flat, elongated body; a handle portion adapted to be grasped by the hand; a tool portion extending outwardly from the handle portion and exposing a sheath scoring blade for scoring a plastic sheath to a controlled depth less than a nominal thickness of the sheath; and, a generally flat sheath engaging and slitting edge including a sheath slitter for engaging, spreading and slitting the plastic sheath lengthwise when the handle portion is grasped and drawn along the sheathed body from a cut of the sheath made by the sheath cutting blade.

23 Claims, 7 Drawing Sheets

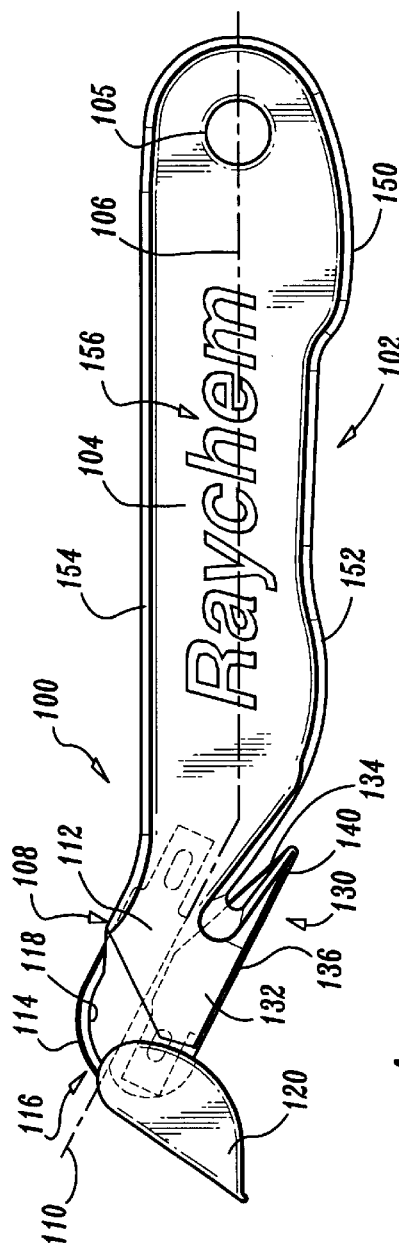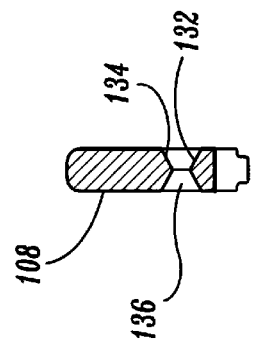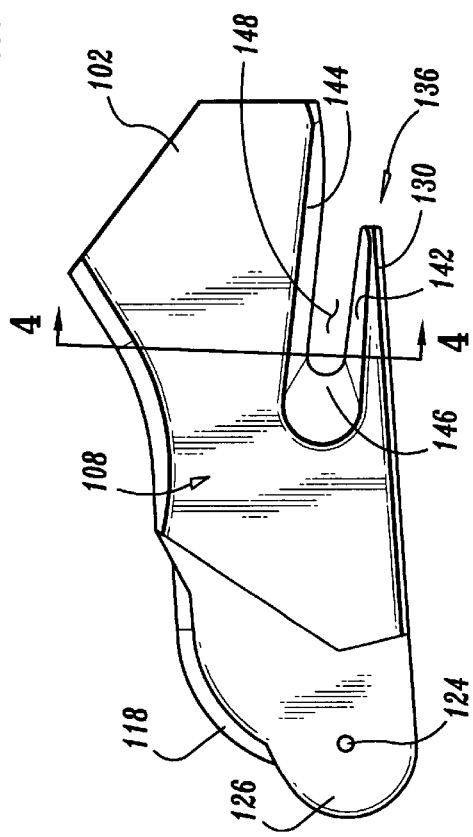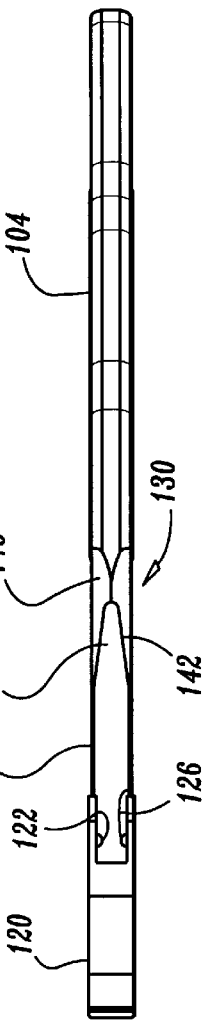

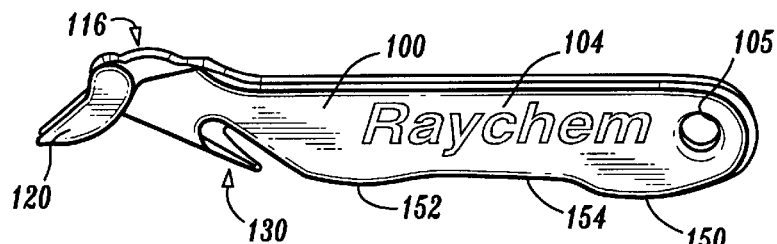
FIG. 5
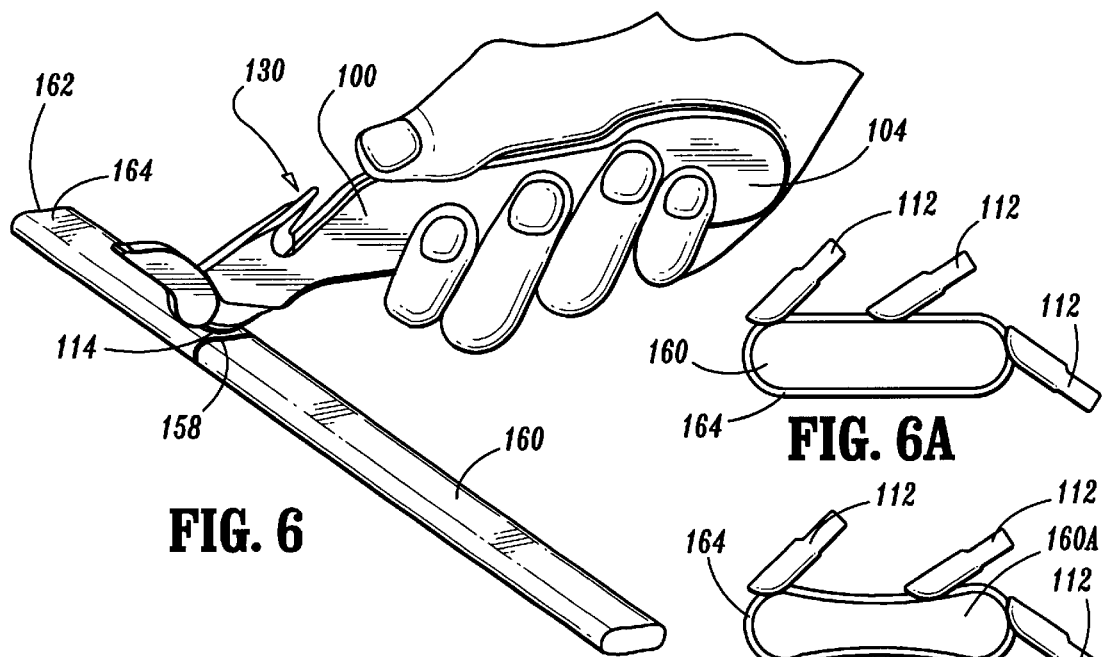
FIG. 6
FIG. 6A
FIG. 6B
FIG. 6C
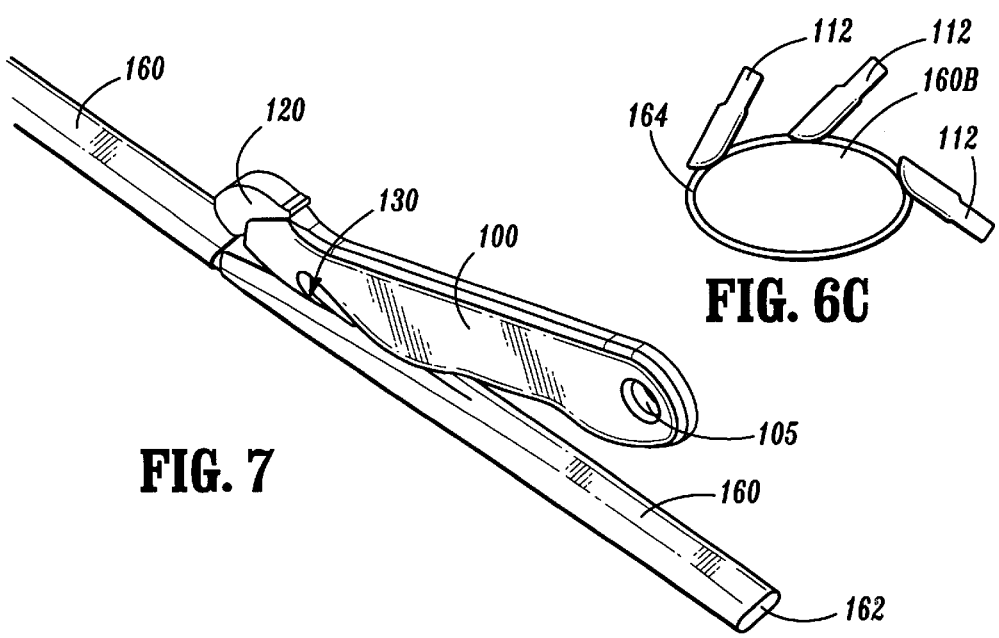
FIG. 7

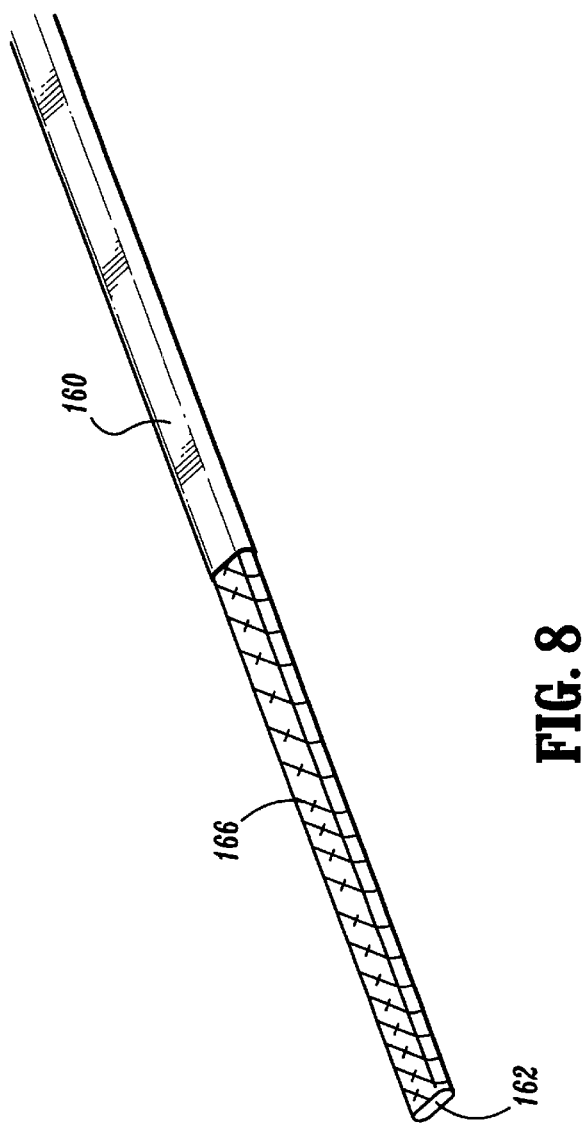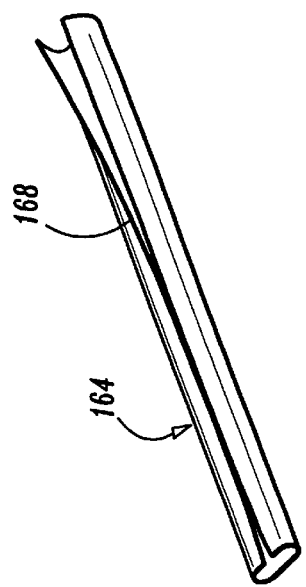
FIG. 8

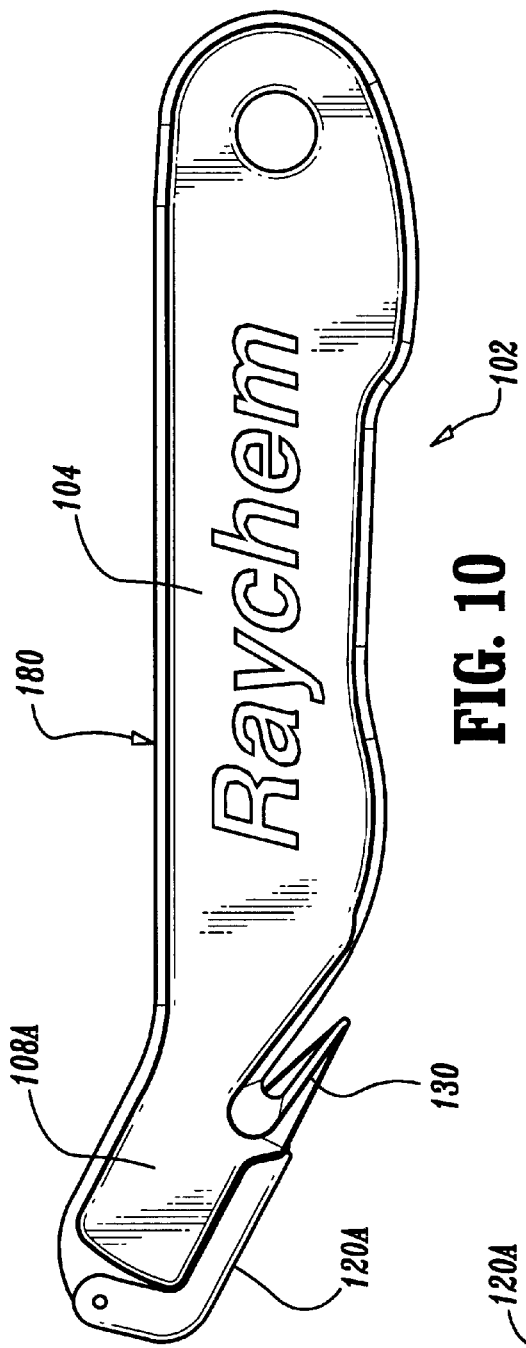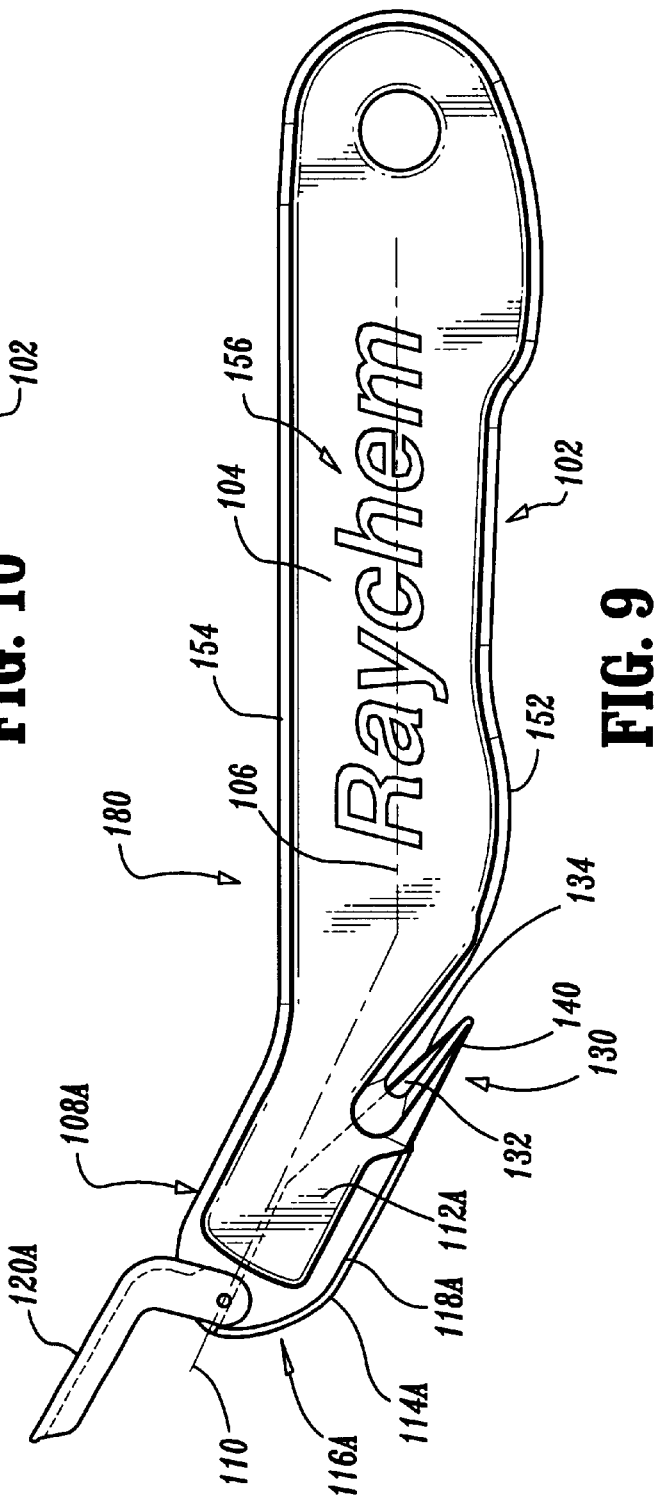

CABLE JACKET STRIPPING TOOL

CROSS REFERENCE TO RELATED APPLICATIONS

This application is a continuation of prior patent application Ser. No. 09/421,442, filed Oct. 19, 1999.

BACKGROUND OF THE INVENTION

1. Field of the Invention

This invention relates generally to hand tools for scoring, slitting and stripping insulative polymeric cable jackets from sheathed electric cables, strip heaters, and the like.

2. Background of the Invention

While there are a wide variety of cable stripping hand tools presently available, none of them have been found to work well for stripping the jackets of self-regulating heating cables, for example. Therefore, general purpose utility, craft or pocket knives have frequently been used for stripping off protective jackets of such cables to enable access to, and electrical connections to be made to an underlying metal braid layer and to the electrical conductors of the strip heaters. While these general purpose cutting tools have been known and widely used for many years, a high level of user skill and experience is required to use such tools safely and successfully, particularly without causing scoring, cutting or other unwanted damage to the underlying metal braid layer, base jacket layer or the conductors themselves. For example, when using a general craft knife or pocket knife it is easy to score and damage the underlying braid layer while cutting through the outer sheath or jacket, since there is no effective regulation of cutting depth other than the skill of the knife's user. In some instances the conductors may be damaged while scoring the base jacket. In addition, there remains a high risk of personal injury to the user from inadvertent cutting because of the relatively large amount of exposed cutting blade edge when conventional general purpose knives and hand tools are used.

Specialized tools have been proposed for cable slitting. For example, U.S. Pat. No. 4,433,484 to Antisdel et al. entitled "Cable Stripper" shows an elongated two-part tool using standard razor blades. One of the blades is exposed within a groove at one end of the tool for scoring the cable jacket, while another blade is exposed within a hook portion at an opposite end of the tool. The hook portion does not include any contouring to aid separation of the cable edge during slitting. Also, the cable scoring blade edge is directly exposed to the user, and the indicated manner of use has the user's thumb placed nearly or directly over the cable scoring blade during the sheath scoring operation, leading to potential personal injury to the thumb.

Another tool for stripping a cable is illustrated in U.S. Pat. No. 4,189,799 to Litehizer, Jr., entitled "Cable Stripping Tool". The disclosed device includes blades for penetrating and tearing off the cable sheath and then for stripping insulation off of ends of individual wires of the cable. The insulation jacket is not always completely removed at the cable end being prepared for connections.

A fairly complicated and expensive two-part tool for stripping cable jackets and wire insulation is shown in U.S. Pat. No. 5,337,479 to Ducret, entitled "Cable and Wire Stripper". This particular tool includes a thumb screw enabling adjustment of cutting depth of the blade used for both scoring and slitting, but does not appear to have a size or overall shape which facilitates easy or comfortable grasping in the use's hand during usage.

Another hand-held tool for stripping off a plastic sheath covering a cable is described in U.S. Pat. No. 5,142,780 to Brewer, entitled "Electric Cable Stripping Tool with Claw". This tool includes a dulled claw which is used to pierce through the outer plastic sheath, and a crescent shaped blade edge including a parting shoe to facilitate slitting operation. Neither the claw nor the crescent shaped blade is effectively shielded to protect the user from being inadvertently cut or punctured.

Other hand-held tools for stripping off cable sheaths are shown for example in U.S. Pat. No. 3,946,487 to Bieganski, entitled "Tools for Cutting"; U.S. Pat. No. 3,881,249 to Cox, Jr., entitled "Cable Stripper"; U.S. Pat. No. 4,472,877 to Undin et at., entitled "Tool for Removing Insulation from Cables"; U.S. Pat. No. 4,081,871 to Knuth, entitled "Electrician's Wire Stripping Tool"; and U.S. Pat. No. 4,426,778 to Christie, entitled "Device for Stripping Wire and Cable". A tool head for an automated cable stripper is shown in U.S. Pat. No. 4,543,717 to Luka, entitled "Cable Stripper".

While such prior approaches appear to have been reasonably effective for their intended purposes, they were not without drawbacks. Some of the approaches featured and required custom blades, or special mechanisms and arrangements enabling the blade to be moved into cutting position or adjusted for cutting depth, or retracted after use. Some did not inherently provide any protection against unwanted exposure to cutting during use or handling. And, many of the prior approaches did not combine the features of relative simplicity, ease of manufacture at low cost, and ease of use, into a single hand-held cutting instrument.

SUMMARY OF THE INVENTION

This invention relates to improvements in hand-held devices for stripping polymeric jackets of cables, such as electrical power cables, communications cables, fiber optic cables and self-regulating heating cables. An elongated and substantially flat plastic sheath cutting and slitting hand tool following the principles of the present invention provides a scoring function and a slitting function in a manner that improves upon prior approaches. For example, the scoring function presents a scoring blade edge of a low cost standard craft knife blade when the tool is held in a first orientation enabling the user to score the plastic sheath to a controlled depth slightly less than the sheath thickness along e.g. a radial score line. A cover structure effectively covers the scoring blade to protect the user from being cut accidentally. The slitting function is used when the tool is turned over to a second orientation in the hand and after the cable at the radial score line has been manipulated to sever completely the plastic sheath. Then, the slitting function featuring a guiding shoe contoured to resemble a hook or plow guides a slitting blade along the cable sheath during a lengthwise slitting operation. The slit section of plastic jacket can then readily be removed.

Hand tools in accordance with the present invention are particularly useful for stripping the polymeric protective and insulating jackets of self-regulating heating cables of the type sold by Raychem HTS, of Menlo Park, Calif. Self-regulating heating cables frequently have unique cross-sectional shapes and multilayer construction. The tools of the present invention may be used with self-regulating heating cables of a broad range of sizes, shapes and jacket materials.

In accordance with principles of the present invention, a plastic sheath scoring and slitting hand tool is provided for cutting and slitting a cable sheath. The tool includes a generally flat, elongated body forming a handle portion adapted to be grasped by the hand, and a tool portion angling outwardly from the handle portion at a predetermined obtuse angle. The tool portion includes a covered a sheath-scoring blade for radially scoring a plastic sheath when the handle portion is grasped in the first orientation. In this regard the sheath scoring blade has a cutting edge following a predetermined contour such as straight or convex, and the tool portion at the blade includes opposed shoulders following the convex contour of the cutting edge in order to establish a predetermined maximum scoring-cutting depth set to correspond generally to thickness of a cable sheath layer to be scored. Further, the tool portion of the body has a generally flat sheath engaging and slitting edge portion defining a sheath slitter for engaging, spreading and slitting the plastic sheath lengthwise when the handle portion is grasped and drawn along the sheathed cable from a score line of the sheath made by the sheath scoring blade. In this regard the sheath slitter includes a slitting blade having a generally straight slitting edge forming an oblique angle facing the handle portion and a contoured sheath-spreading foot at an outer end of the slitting blade for engaging an underside, and spreading apart facing edges, of the cable sheath undergoing slitting by the slitting blade as the hand tool is drawn along a length of cable during a cable slitting operation. A number of different geometries and arrangements for the cable scoring feature are described.

These and other objects, advantages, aspects and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

The invention is illustrated in the accompanying drawings, in which

FIG. 1 is a slightly enlarged view in side elevation of a plastic sheath scoring and slitting hand tool in accordance with principles of the invention.

FIG. 2 is an enlarged detail side view in elevation of a tool portion of the main body of the FIG. 1 scoring and slitting hand tool.

FIG. 3 is a bottom plan view of the FIG. 1 scoring and slitting hand tool.

FIG. 4 is a sectional view of the main body of the FIG. 1 scoring and slitting hand tool taken along a section line 4—4 in FIG. 2.

FIG. 5 is an isometric view of the FIG. 1 scoring and slitting hand tool with a scoring blade cover in the opened position preparatory to a sheath radial scoring operation.

FIG. 6 is an isometric view of the FIG. 1 scoring and slitting hand tool being grasped in a first orientation for making a radial scoring cut across a cable sheath.

FIG. 6A is a diagrammatic sectional view illustrating making a radial cut in the sheath of a generally flat cable.

FIG. 6B is a diagrammatic sectional view illustrating making a radial cut in the sheath of a cable having a dog-bone cross-section.

FIG. 6C is a diagrammatic sectional view illustrating making a radial cut in the sheath of an oval-shaped cable.

FIG. 7 is an isometric view of the FIG. 1 scoring and slitting hand tool being grasped in a second orientation for making a longitudinal slit along the sheath and for parting the sheath along the longitudinal slit line.

FIG. 8 is an isometric view showing axial separation and removal of a sheath segment which has been radially scored and cut in accordance with the operation shown in FIG. 6 and longitudinally slit in accordance with the operation shown in FIG. 7 of the FIG. 1 cutting and slitting hand tool.

FIG. 9 is a view in side elevation of an alternative embodiment of a cable sheath scoring and slitting hand tool in accordance with principles of the present invention in which the scoring blade and the slitting blade are arranged along a single angled edge of the hand tool.

FIG. 10 is a view in side elevation of the FIG. 9 embodiment with the scoring blade cover placed over the scoring blade

DETAILED DESCRIPTION OF THE INVENTION

Figure 11:
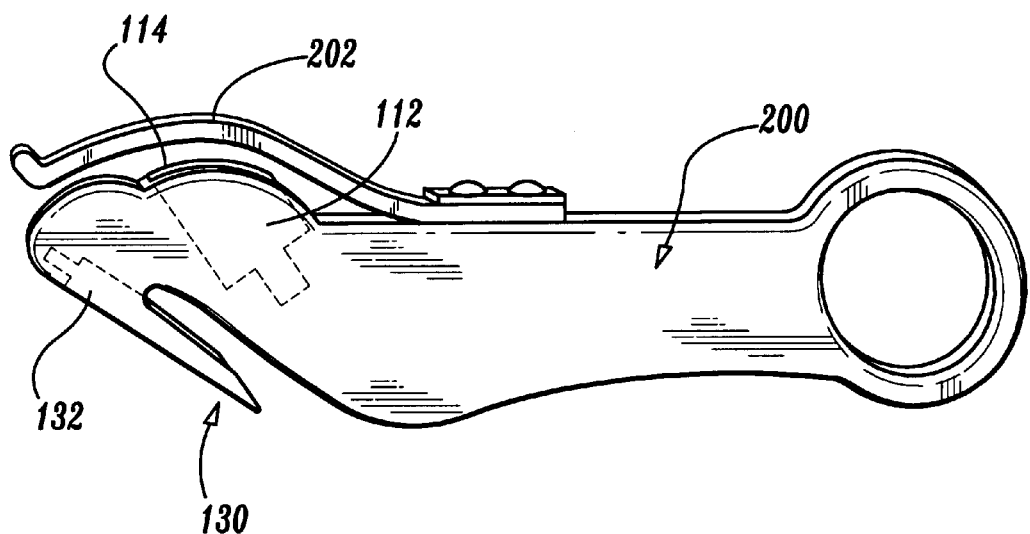
FIG. 11 is an isometric view of another alternative embodiment of a cable sheath scoring and slitting hand tool in accordance with principles of the present invention.

A cutting and slitting hand tool 100 is shown in FIG. 1 to include a body 102 having an elongated handle portion 104 which defines an opening 105 at a distal end to enable the tool 100 to hang on a hook of a tool rack or user's belt. The handle portion 104 is sized to be grasped comfortably in the hand of an adult user (see e.g. FIG. 6) and extends along a major longitudinal axis 106. The handle portion 104 merges into a tool portion 108 which extends distally along a minor longitudinal axis 110. Minor axis 110 forms an obtuse angle, such as approximately 153 degrees, relative to major longitudinal axis 106, thereby resulting in the tool portion 108 being obliquely canted relative to the handle portion 104 for reasons which will be more fully explained and understood in connection with FIGS. 6 and 7. The tool body 102 is approximately 6.37 inches (162 mm) in length between its proximal and distal ends.

The tool portion 108 includes a cable jacket scoring feature comprising a cutting blade 112 having a convexly curved cutting edge 114 presented at a curved outer end 116 of the portion 108 lying generally to one side of the minor axis 110. The curved outer end 116 includes a shoulder 118 which is spaced away from, and most preferably follows the contour of the curved cutting edge 114. The distance between the shoulder 118 and the curved blade edge 114 is selected to limit the depth of cut of the edge 114 to the thickness of a plastic sheath of a cable to be cut, and also provides some protection to the user of the tool 100 to prevent accidental deep wounds. Preferably, the shoulder 118 slightly tapers away from the blade edge 114. In accordance with one aspect of the present invention, the cutting blade comprises a standard craft blade, such as an X-acto™#10 blade made by Hunt Corporation, Statesville, N.C., or equivalent. A generally U-shaped cover 120 is pivotally mounted to the tool portion 108 and covers the edge 114 when in a closed position, as shown in FIG. 7, for example. Molded cylindrical or hemispherical projections 122 of the cover 120 mate with aligned recessed cylindrical openings 124 in the tool portion 108 thereby enabling the cover 120 to be snap-locked onto the tool portion 108 while permitting the cover 120 to be rotated by the user in order alternately to cover and expose the cutting blade 112. When the cutting blade 112 is not being used, the cover is positioned over the blade 112 in order to provide protection to the user against accidental cutting. The cover 120 is dimensioned to present a slight interference fit with the adjacent walls 126 of a thinned distal end region of the tool portion 108, so that the cover 120 remains securely in the cutting-blade-covering position, shown in FIG. 7.

The tool portion 108 also includes a sheath slitter 130 having a slitting blade 132 with a generally straight cutting edge 134 exposed at an oblique angle generally facing back toward the handle portion 104. The sheath slitter 130 is formed as a contoured hook or plow shape inset along a side 136 of the tool portion 108 generally parallel with the minor axis 110 and opposite to the curved outer end 116. The slitting blade 132 most preferably comprises a standard craft blade, such as an X-act™#11 blade also made by Hunt Corporation, Statesville, N.C., or equivalent. An outer end portion of the slitting blade 132 is held in a shoe 140 defined by tapered edges 142. The shoe 140 tapers toward the distal end of the edge 134 of slitting blade 132. Opposite tapered edges 144 and bridging end tapers 146 of the sheath slitter 130 define a slot 148 containing the exposed straight cutting edge 134 of the slitting blade 132. The tapers 142, 144 and 146 facilitate guiding and spreading the sheath along a longitudinal slitting line during a sheath-slitting operation of the hand tool 100 as more fully explained in connection with FIG. 7.

The tool body 102 is most preferably formed by injection-molding a black polycarbonate thermoplastic material into a suitably contoured injection mold which holds cutting blade 112 and slitting blade 132 in position during the molding process. The thermoplastic material most preferably comprises 30% glass fiber filler to provide mechanical strength and durability to the body 102 while permitting some range of torque and bending during usage. Alternatively, and with greater expense in volume production, the tool body 102 may comprise two complementary halves severed along a plane including the cutting blade 112 and slitting blade 132. Several screws and nuts are provided to hold the two complementary halves together with blades 112 and 132 in place. Since the standard blades 112 and 132 include standard keying features and sizes, the complementary halves may be arranged to lock the blades 112 and 132 in place when the two halves are joined together. This alternative, more costly, arrangement thereby enables the blades 112 and 132 to be replaced and the cutting edges 114 and 134 thereby to be restored after extended usage of the tool 100. The tool body 102 is most preferably formed as an elongated, generally flat construction having a nominal transverse thickness of approximately 0.25 inch. Certain non-functional or ornamental features, such as for example curved portions 150 and 152, as well as peripheral flanges or bosses 154 extending along the outer edges of the handle portion 104, provide certain aesthetic enhancements to the basic functional design of the tool 100. A thinned flat web portion of the handle portion 104 provides an ideal location for a logo or other informative message. The logo or message may be added as a feature during molding of the body 102, or it may be subsequently engraved into the body at region 156, or it may comprise a pressure-sensitive sticker or decal, or be applied by stencil.

Stripping away of a desired length of cable jacket 164 of a cable 160 is progressively illustrated in the views of FIGS. 5, 6, 7 and 8. A first step shown in FIG. 5 is to rotate the blade cover 120 to a fully opened position, thereby exposing the outwardly curved cable jacket-scoring blade 114. The next step, shown in FIG. 6, is to select a scoring location 158 inwardly of an end 162 of a cable to be stripped, such as the multi-layer self-regulating strip heater cable 160. The tool 100 is grasped by the user's hand (either the right hand as shown in FIG. 6 or the left hand can be used) in the "upside down" or reverse position, which presents the scoring blade 114 directly adjacent to the radial scoring location 158, while the cable 160 is held or maintained by the user's other hand against a suitable work surface. The tool 100 is then drawn around the cable and thereby scores the outer jacket 164 to a depth controlled by the shoulder 118 of the tool portion 108 which follows the contour of the blade 112. In this manner only the outer jacket 164 is cut, and the immediately underlying braid layer is not scored or cut.

FIGS. 6A, 6B and 6C show that the outwardly curved cutting blade 114 enables the tool 100 to be used successfully with a wide variety of regularly and irregularly shaped cables, such as the flat cable 160 shown in FIG. 6A, or a "dog-bone" shaped cable 160A shown in FIG. 6B, or an oval shaped cable 160B shown in FIG. 6C. The scoring blade 112 scores the jacket layer 164 to a precise depth that is slightly less than the thickness of the cable jacket 164, thereby preventing damage to the underlying braid layer 166, base jacket layer or individual conductors. As shown in FIGS. 6, 6A, 6B and 6C, the scoring feature is used primarily to score the cable jacket radially, but can be used for axial or longitudinal scoring as well. At this point the user closes the cover 120 and puts down the tool 100.

Once the cable 160 has been scored along the scoring line 158, the cable is grasped between the user's hands and flexed back and forth several times. This bending or flexing operation causes the jacket 164 to become completely severed along the score line 158. Then, the tool 100 is grasped by the user's hand in the "right-side-up" orientation shown in FIG. 7, and the tip or foot 140 of the slitting feature is inserted beneath the jacket 164 and above the braid layer 166 (shown in FIG. 8) at the scoring line 158 and in an orientation leading to the cable end 162. The tool 100 is then drawn by the user toward the cable end 162 while the cable 160 is maintained in a stationary position, causing the cable jacket to be slit along a slit line 168, shown in FIG. 8. Once the segment of cable jacket 164 is completely slit open along its longitudinal extent, the tool 100 is put down, and the user may then grasp and further separate the severed and slit segment of cable jacket 164 from the underlying braid layer 166. Then, the separated segment can readily be removed from the cable 160, leaving the exposed braid layer 166 at the stripped region adjacent to cable end 162, for further cable end preparation steps as may be needed to complete a particular cable connection operation, as shown in FIG. 8.

While the tool 100 is a presently preferred embodiment of the invention, principles of the invention may be embodied in tools having variations upon the tool 100. For example, in FIGS. 9 and 10, a cable sheath scoring and slitting hand tool 180 has a scoring blade 112A with scoring edge 114A arranged along a same edge of the tool portion 108A as the cable slitter 130. In this regard, a shoulder 118A of the tool body follows the curved contour of the blade edge 114A in order to limit the depth of the score cut made during usage of the tool 180. A cover 120 is hinged to the tool portion 108A, has a geometry generally following the contour of the blade edge 114A and is moved to an open, blade-edge-exposing position as shown in FIG. 9 in order to permit the sheath scoring operation, and is then moved to a closed position as shown in FIG. 10 in order to protect the user or any other object from being inadvertently cut when the scoring feature is not in actual use. The scoring blade 112A may be a standard craft blade, such as the blade 112, in which circumstance the scoring blade 112A is positioned adjacently against the standard craft slitting blade 132. Alternatively, and preferably, the scoring blade 112A and the slitting blade are formed of a single piece of tool steel and embedded as a single unit in the orientation shown in FIG. 9. The tool 180 therefore enables the user to perform both the sheath scoring function shown in FIG. 6 and the cable slitting function shown in FIG. 7 while the hand tool is grasped in a single orientation in the user's hand.

In FIG. 11, a tool 200 has a cover 202 over the scoring feature of blade 112 forming a leaf spring. In the tool 200 the cable is drawn between the scoring feature and the leaf spring and the jacket is thereupon scored at the score line 158 along both major sides. The bending and twisting operation then separates the jacket from the cable sufficiently to enable insertion of the foot of the slitting feature 130, and the operation proceeds as per the method of use of the tool 100 described above.

Figure 12:
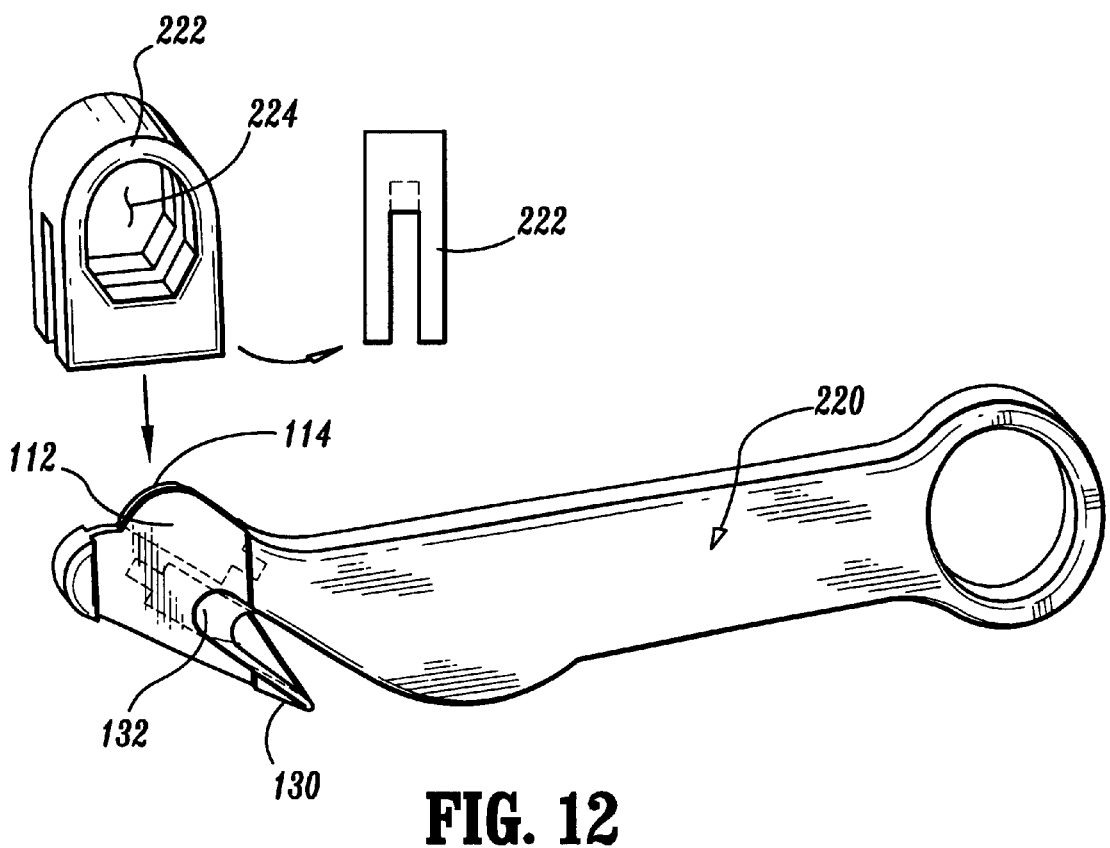
FIG. 12 is an isometric view of yet another alternative embodiment of a cable sheath scoring and slitting hand tool in accordance with principles of the present invention.

FIG. 12 illustrates a tool 220 having a cover 222 for covering the scoring feature of blade edge 114. The cover 222 includes a central transverse opening 224 sized to receive the cable 160. When the cable is inserted through the cover 222 and the score line 158 is reached, the user pushes downwardly on the top of the cover 222 and thereby applies pressure to force the cable jacket into contact with the scoring blade edge 114. The cable jacket is scored radially along the score line 158 as the cable 160 is rotated inside the cover 222. The slitting operation of tool 220 is the same as with tool 100.

Figure 13A:
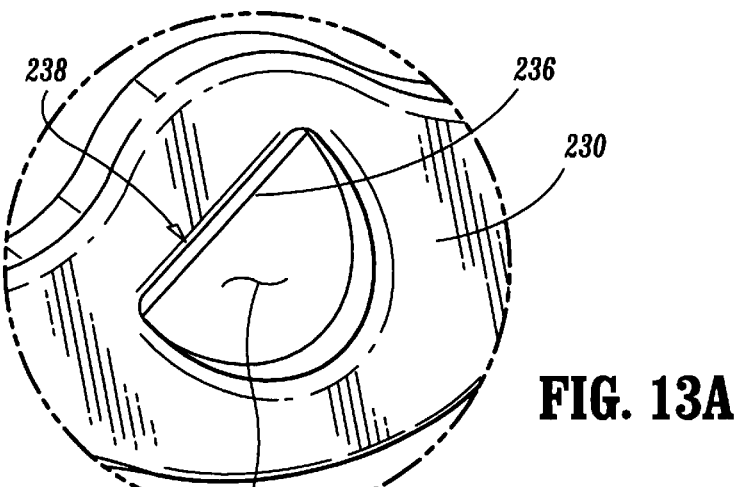
FIG. 13A is a slightly enlarged side view in elevation of the cable-scoring feature of the FIG. 13 tool.
Figure 13:
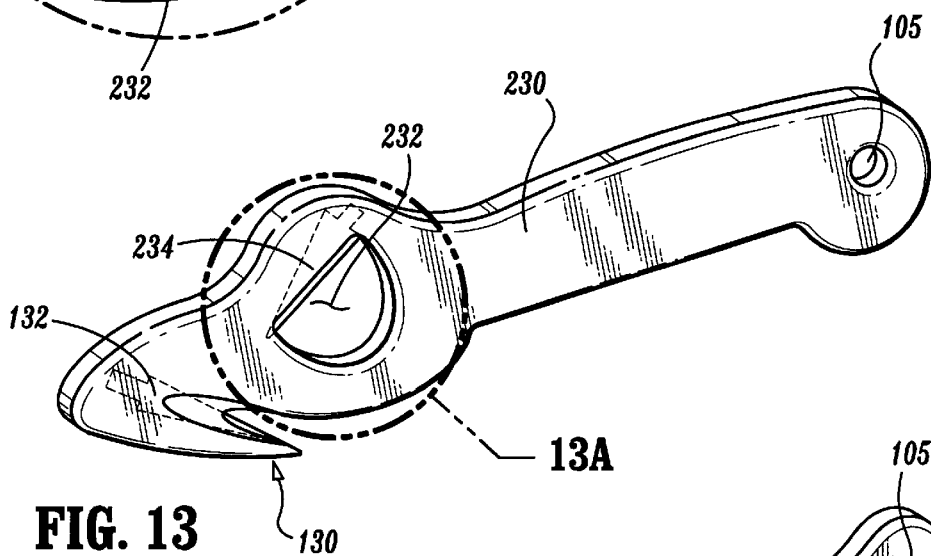
FIG. 13 is an isometric view of a further alternative embodiment of a cable sheath scoring and slitting hand tool in accordance with principles of the present invention.

FIG. 13 illustrates a tool 230 having a central opening 232 sized to receive the cable 160 therethrough. A standardized craft blade 234 is positioned at the central opening 232 such that its generally flat blade edge 236 projects from the central opening to a predetermined score depth preferably less than the nominal thickness of the cable jacket. FIG. 13A shows that the blade edge 236 extends for a distance into the opening 232 controlled by a tapered shoulder 238. The cable is inserted into the opening 232 until the score line 158 is reached. Then, the cable 160 is rotated relative to the tool 230 (either the cable end is rotated, the tool is rotated, or a combination of cable end rotation and tool counter-rotation is carried out) along the score line 158 to score the cable. The tool 230 is thereafter used as with the tool 100 to slit the cable jacket and enable removal thereof.

Figure 14:
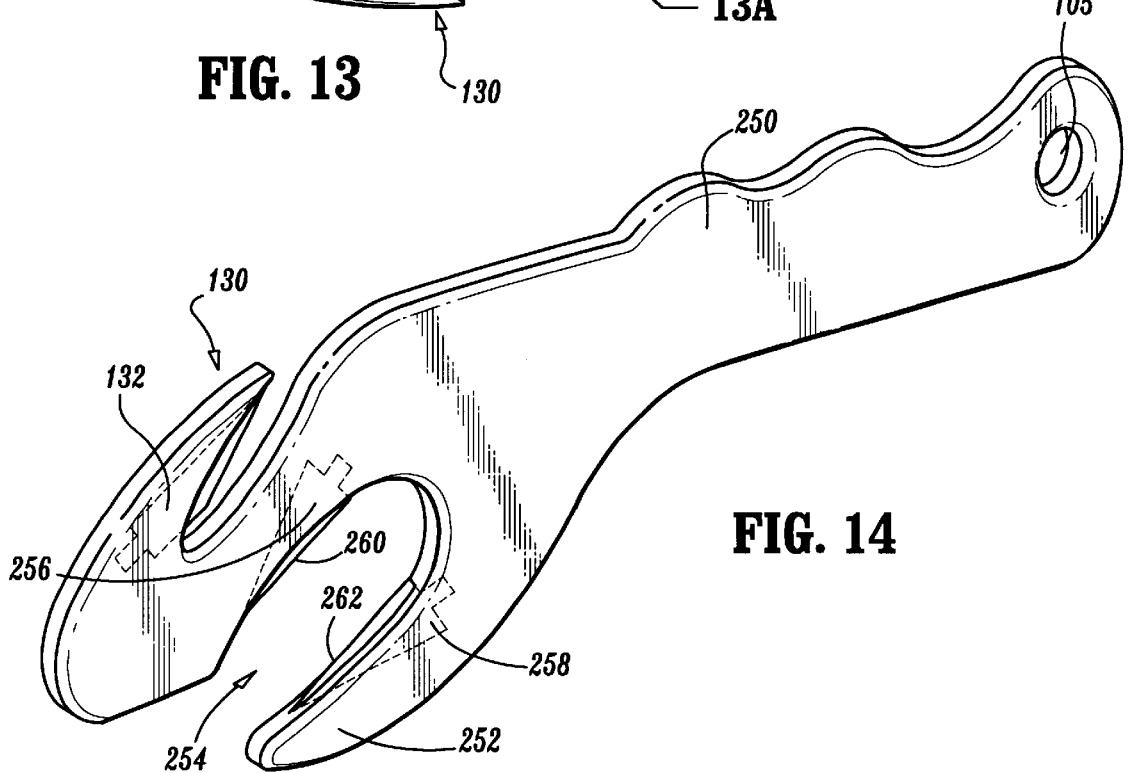
FIG. 14 is an isometric view of yet one more alternative embodiment of a cable sheath scoring and slitting hand tool in accordance with principles of the present invention.

FIG. 14 illustrates a tool 250 having a scoring feature 252 comprising a generally oval shaped slot 254 sized to receive the cable 160 at score line 158. Two standard craft blades 256 and 258 are positioned at edges of the slot 254 and have respective oppositely facing blade edges 260 and 262 extending for a controlled distance into the slot 254 sufficient to score the cable jacket 162 to a depth slightly less than the nominal thickness thereof The step of inserting the cable 160 into the slot 254 causes the major surfaces of the jacket to be scored along radial score line 158. The tool 250 is thereafter used as with the tool 100 to slit the cable jacket and thereby facilitate its removal.

Figure 15:
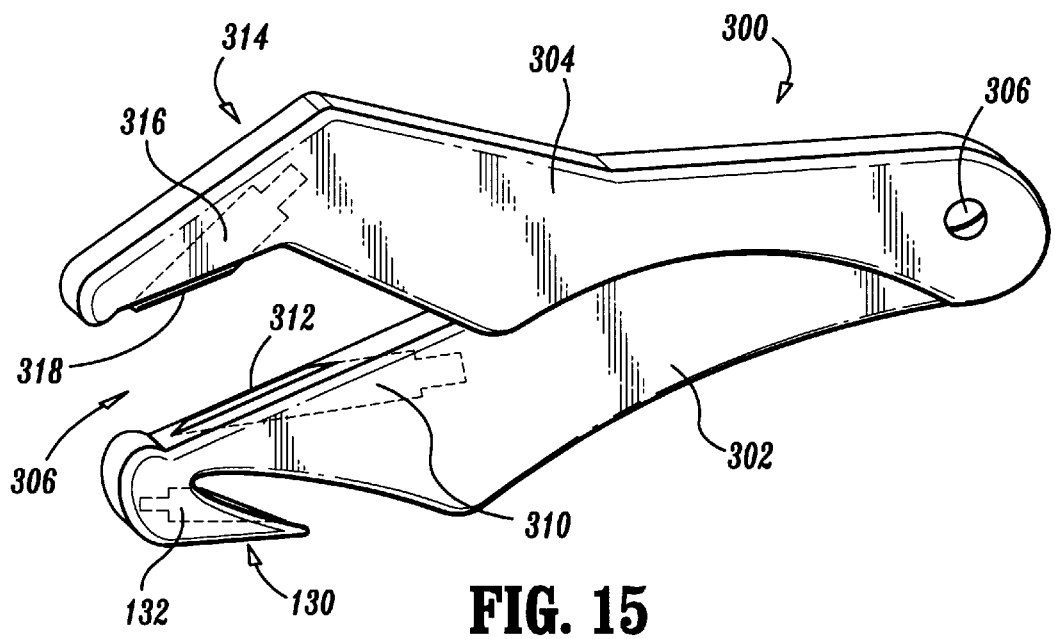
FIG. 15 is an isometric view of still another alternative embodiment of a cable sheath scoring and slitting hand tool in accordance with principles of the present invention.

FIG. 15 illustrates a two-piece tool 300 comprising a first handle portion 302 having a scoring feature provided by a straight edge craft blade 310 and the slitting feature 130 of the tool 100. A second handle portion 304 is pivotally mounted to the first handle portion by a pivot pin 306 such as a threaded screw. The second handle portion 304 provides an active cover portion 314 which covers the exposed edge 312 of blade 310 and includes a second standard straight edge craft blade 316 having an exposed edge 318 facing the exposed edge 312 of blade 310. In this "scissors-like"embodiment 300, the cable is placed into a slot 306 formed between the first handle portion 302 and the second handle portion 304, and the tool 300 is drawn across the cable at the score line 158 thereby to score the cable. The tool 300 is then used as with the tool 100 to slit the cable jacket and enable its removal from the cable end. Since the size of the slot 306 may be widely varied, cables of widely varying diameters may be precisely scored along a desired radial score line, such as score line 158.

Figure 16:
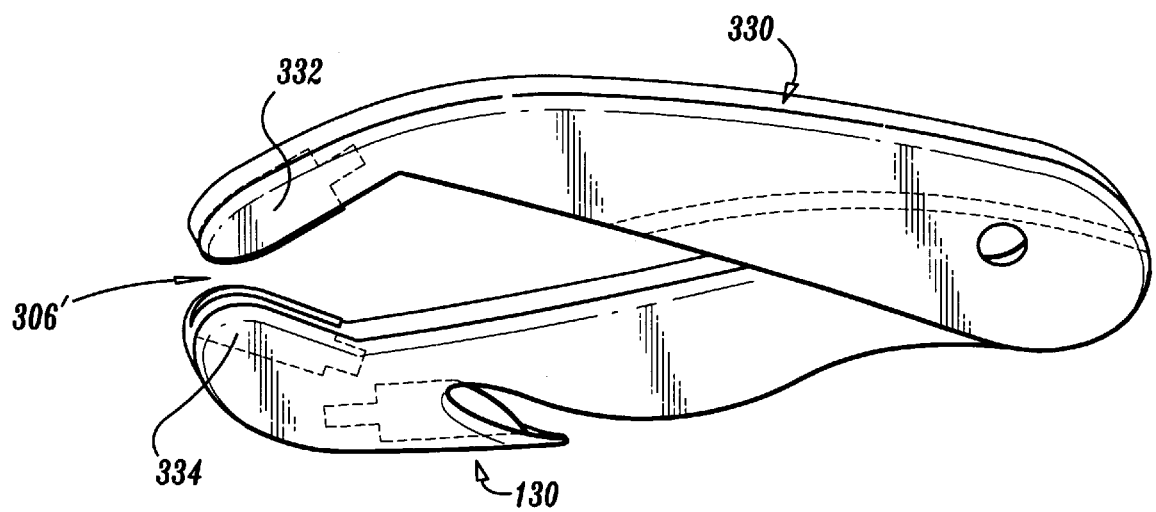
FIG. 16 is an isometric view of yet another alternative embodiment of a cable sheath scoring and slitting hand tool in accordance with principles of the present invention.

FIG. 16 illustrates another two-piece tool 330 which is very similar to the tool 300, except that craft blades 332 and 334 of the scoring feature have curved blade edges, thereby enabling the scoring feature to accommodate a wide variety of cable contours as well as cable thicknesses, along the desired radial score line 158. The tool 330 includes the slitting feature 130 previously described in connection with tool 100 and is used to slit the cable in the same manner as tool 100.

In all of the foregoing embodiments, the scoring features included shoulders following the contour of the scoring blades such that scoring of the cable jacket occurs to a controlled depth less than the nominal thickness of the cable jacket. In each embodiment of the invention illustrated above the scoring blade is effectively covered or shielded to prevent the user or other object from being accidentally or inadvertently cut. Further, each of the embodiments described above included a cable-slitting feature 130 having a foot and sidewall contours for guiding and peeling apart severed edges of the cable jacket during the longitudinal jacket slitting operation.

Those skilled in the art will appreciate that many changes and modifications will become readily apparent from consideration of the foregoing descriptions of preferred embodiments without departure from the spirit of the present invention, the scope thereof being more particularly pointed out by the following claims. The descriptions herein and the disclosures hereof are by way of illustration only and should not be construed as limiting the scope of the present invention.

What is claimed is:

1. A plastic sheath scoring and slitting hand tool for scoring and slitting a non-circular cable sheath of a cable comprising:
   a generally flat, elongated body,
   a handle portion of the body adapted to be grasped by the hand, and
   a tool portion of the body extending outwardly from the handle portion, the tool portion exposing a sheath-scoring blade having a cutting edge following a predetermined contour selected from the group consisting of a straight contour and a convex contour fixed in the tool portion for scoring a plastic sheath to a controlled depth limited by adjacent structure of the tool portion to be not greater than a nominal thickness of the sheath, and the tool portion of the body having a generally flat sheath engaging and slitting edge including a sheath slitter having a slitting blade fixed in the tool portion and inset along the engaging and slitting edge for engaging, spreading and slitting the plastic sheath lengthwise when the handle portion is grasped and drawn along the sheathed body from a score cut of the sheath made by the sheath-scoring blade.

2. The plastic sheath scoring and slitting hand tool set forth in claim 1 wherein the tool portion exposing the sheath-scoring blade is formed at a curved distal end region of the tool portion.

3. The plastic sheath scoring and slitting hand tool set forth in claim 1 wherein the tool portion of the body defines an obtuse angle relative to a longitudinal axis of the handle portion such that the curved end faces away from a thumb of the hand when the handle portion is grasped in the first orientation.

4. The plastic sheath scoring and slitting hand tool set forth in claim 1 further comprising cover means for covering the sheath-scoring blade.

5. The plastic sheath scoring and slitting hand tool set forth in claim 4 wherein the cover means is hinged to the tool portion.

6. The plastic sheath scoring and slitting hand tool set forth in claim 1 wherein the sheath-scoring blade for scoring a plastic sheath to a controlled depth less than a nominal thickness of the sheath is exposed to a cable sheath to be scored when the hand tool is grasped in the hand in a first orientation, and wherein the sheath slitter for engaging, spreading and slitting the plastic sheath lengthwise when the handle portion is grasped in the hand in a second orientation generally one half of one full rotation of the tool from the first orientation and drawn along the sheathed body from the score cut.

7. The plastic sheath scoring and slitting hand tool set forth in claim 1 wherein the sheath-scoring blade and the sheath slitter are formed along a single edge of the tool portion of the hand tool, thereby enabling sheath scoring and slitting operations to be carried out when the tool is grasped in the hand in a single orientation.

8. The plastic sheath scoring and slitting hand tool set forth in claim 4 wherein the cover means is slideably engaged to the tool portion and includes a central transverse opening for receiving the cable therethrough.

9. The plastic sheath scoring and slitting hand tool set forth in claim 4 wherein the cover means comprises an arm pivotally mounted to the handle portion and further comprising a cable sheath second scoring blade having an edge facing an edge of the sheath-scoring blade.

10. The plastic sheath scoring and slitting hand tool set forth in claim 1 wherein the tool portion defines an opening sized to receive the cable and wherein the cable sheath-scoring blade is located at an inside wall defining the opening.

11. The plastic sheath scoring and slitting hand tool set forth in claim 10 wherein the opening forms an open-ended slot extending from an edge of the tool portion.

12. The plastic sheath scoring and slitting hand tool set forth in claim 11 wherein the tool portion comprises a leaf spring defining the opening.

13. The plastic sheath scoring and slitting hand tool set forth in claim 11 further comprising a cable sheath-second-scoring blade having an edge facing an edge of the sheath-scoring blade.

14. The plastic sheath scoring and slitting hand tool set forth in claim 1 wherein the sheath-slitting blade comprises a standard craft straight cutting blade.

15. The plastic sheath scoring and slitting hand tool set forth in claim 7 wherein the sheath-scoring blade and the sheath slitting blade comprise separate blade portions of a single knife element.

16. The plastic sheath scoring and slitting hand tool set forth in claim 1 wherein the generally flat, elongated body is a unitary structure formed of an injection molded glass filled polycarbonate thermoplastic resin material.

17. The plastic sheath scoring and slitting hand tool set forth in claim 16 wherein the sheath-scoring blade and the sheath slitting blade comprise blade structure permanently embedded during the molding process within the elongated body unitary structure.

18. The plastic sheath scoring and slitting hand tool set forth in claim 1 wherein the generally flat, elongated body comprises two complementary sections, wherein the sheath-scoring blade comprises a standard craft cutting blade having a convex contour, wherein the sheath slitting blade comprises a standard craft straight cutting blade, and wherein the cutting blade having a convex contour and the straight cutting blade are removably held in place between the two complementary sections by section securing means.

19. The plastic sheath scoring and slitting hand tool set forth in claim 1 wherein the sheath-scoring blade has a cutting edge following a predetermined convex contour and wherein the curved end of the tool portion defines opposed shoulders following the convex contour of the cutting edge thereby to establish and limit a predetermined cutting depth of the sheath scoring blade to correspond generally to less than a nominal thickness of a cable sheath to be cut.

20. The plastic sheath scoring and slitting hand tool set forth in claim 1 wherein the sheath slitting blade has a generally straight slitting edge forming an oblique angle facing the handle portion and a contoured sheath-spreading foot at an outer end of the slitting blade for engaging an underside, and spreading apart facing edges, of the cable sheath to be slit along a length thereof.

21. A non-circular cable scoring and stripping tool sized to be held in the hand and comprising:

an elongated, generally flat body defining a handle portion forming hand grip, and a tool portion extending at a predetermined obtuse angle from one end of the handle portion, a sheath scoring region including a scoring blade along an outermost edge region of the tool portion having a cutting edge following a predetermined convex contour, the tool portion defining opposed shoulders following the predetermined convex contour of the cutting edge to establish a predetermined maximum cutting depth set to correspond to less than the thickness of a cable sheath to be scored and stripped, and a sheath slitting region along a slitting edge region inset from the outermost edge region and including a slitting blade having a generally straight slitting edge forming an oblique angle relative to the slitting edge region, the body defining a contoured sheathspreading foot at an outer end of the slitting blade for engaging an underside, and spreading apart facing edges, of the cable sheath undergoing slitting by the slitting blade as the tool is grasped and drawn along an end segment of a cable to be stripped of its sheath.

22. A plastic sheath scoring and slitting hand tool for scoring and slitting a non-circular cable sheath comprising:

a generally flat, elongated body, a handle portion of the body adapted to be grasped by the hand in a first orientation and in a second orientation, a tool portion of the body angling outwardly from the handle portion at a predetermined obtuse angle, the tool portion having an end defining a sheath-scoring blade for scoring a plastic sheath along a radial score line when the handle portion is grasped in the first orientation, the sheath-scoring blade having a cutting edge following a predetermined contour selected from the group consisting of a straight contour and a convex contour, the end defining opposed shoulders following the contour of the cutting edge to establish a predetermined maximum cutting depth set to correspond generally to thickness of a cable sheath to be cut, and the tool portion of the body having a generally flat sheath engaging and slitting edge portion defining a sheath slitter for engaging, spreading and slitting the plastic sheath lengthwise when the handle portion is grasped in the second orientation and drawn along the sheathed body from a score of the sheath made by the sheath-scoring blade, the sheath slitter including a slitting blade having a generally straight slitting edge forming an oblique angle facing the handle portion, the sheath slitter further defining a contoured sheath-spreading foot at an outer end of the slitting blade for engaging an underside, and spreading apart facing edges, of the cable sheath undergoing slitting by the slitting blade as the hand tool is drawn along a length of cable to be slit.

23. The plastic sheath scoring and slitting and tool set forth in claim 1 wherein the sheath-scoring blade is on the opposite side of the tool portion from the sheath slitting blade.

* * * * *